(12) United States Patent
Iwakiri et al.

(10) Patent No.: US 11,691,170 B2
(45) Date of Patent: Jul. 4, 2023

(54) PAINTING FACILITY

(71) Applicant: Taikisha Ltd., Tokyo (JP)

(72) Inventors: Hiroshi Iwakiri, Tokyo (JP); Tomotaka Miwa, Tokyo (JP)

(73) Assignee: Taikisha Ltd., Tokyo (JP)

( * ) Notice: Subject to any disclaimer, the term of this patent is extended or adjusted under 35 U.S.C. 154(b) by 0 days.

(21) Appl. No.: 17/623,758

(22) PCT Filed: Jul. 5, 2021

(86) PCT No.: PCT/JP2021/025277
§ 371 (c)(1),
(2) Date: Dec. 29, 2021

(87) PCT Pub. No.: WO2023/281567
PCT Pub. Date: Jan. 12, 2023

(65) Prior Publication Data
US 2023/0001439 A1   Jan. 5, 2023

(51) Int. Cl.
*B05B 16/60*    (2018.01)
*B05B 16/40*    (2018.01)

(52) U.S. Cl.
CPC .............. *B05B 16/60* (2018.02); *B05B 16/40* (2018.02)

(58) Field of Classification Search
CPC ................................ B05B 16/40; B05B 16/60
USPC .......................................................... 454/52
See application file for complete search history.

(56) References Cited

U.S. PATENT DOCUMENTS

| 5,153,034 A | 10/1992 | Telchuk et al. |
| 5,173,118 A * | 12/1992 | Josefsson ................ B05B 16/95 454/52 |
| 2018/0311695 A1 | 11/2018 | Saito et al. |
| 2018/0311696 A1 | 11/2018 | Saito et al. |
| 2019/0176181 A1 | 6/2019 | Saito et al. |

FOREIGN PATENT DOCUMENTS

| GB | 2160639 A | 12/1985 |
| JP | 60216862 A | 10/1985 |
| JP | 679207 A | 3/1994 |
| JP | 6154677 A | 6/1994 |
| JP | 2002277038 A | 9/2002 |
| JP | 2009189916 A | 8/2009 |
| JP | 201787159 A | 5/2017 |
| JP | 201787160 A | 5/2017 |
| JP | 2017124357 A | 7/2017 |
| JP | 2018187542 A | 11/2018 |

(Continued)

*Primary Examiner* — Allen R. B. Schult
(74) *Attorney, Agent, or Firm* — The Webb Law Firm (57) ABSTRACT

A painting facility 1 includes a painting chamber 3 in which a spray painting operation is effected on a painting object W, an air supplying chamber 2 configured to supply air into the painting chamber 3 via an air supplying section 4a, 4b provided in a ceiling portion 30 of the painting chamber 3, and an air discharging chamber 5 configured to suction air and uncoated paint mist present in the painting chamber 3 via a floor discharging section of the painting chamber 3, two air supplying sections 4a, 4b are disposed in left-right symmetry relative to a position of the painting object W in a width direction of the painting chamber 3 as the center therebetween. Air is released in a radial form from an outlet portion 40 of each one of the two air supplying sections 4a, 4b.

13 Claims, 5 Drawing Sheets

(56) References Cited

FOREIGN PATENT DOCUMENTS

| JP | 2018192432 A | 12/2018 |
| JP | 2018192433 A | 12/2018 |
| WO | 2018198484 A1 | 11/2018 |

* cited by examiner

PAINTING FACILITY

CROSS-REFERENCE TO RELATED APPLICATION

This application is the United States national phase of International Application No. PCT/JP2021/025277 filed Jul. 5, 2021, the disclosure of which is hereby incorporated by reference in its entirety.

BACKGROUND OF THE INVENTION

Field of the Invention

The present invention relates to a painting facility including a painting chamber in which a spray painting operation is effected on a painting object (an object to be painted), an air supplying chamber configured to supply air into the painting chamber via an air supplying section provided in a ceiling portion of the painting chamber, and an air discharging chamber configured to suction air and uncoated (unused) paint mist present in the painting chamber via a floor discharging section of the painting chamber.

Description of Related Art

As one method of saving energy or reducing a carbon dioxide emission in an operation of a painting facility, it is conceivable to reduce a fan power of an air supplying fan connected to the air supplying chamber, namely, to reduce its air flow amount.

At present, as a form of such air supplying section provided in the ceiling of the painting chamber, one having a flat shape provided substantially in the entire surface of the ceiling has become the mainstream. According to this form, uniform flow of air from the ceiling to the floor discharging section of the painting chamber can be formed in the entire painting chamber.

Further, as disclosed in Patent Documents 1-5 identified below, for instance, various forms are known also regarding a painting facility having an air supplying section provided at a locally limited portion(s) of the ceiling, not over the entire face of the ceiling of the painting chamber. With these forms, uncoated paint mist ("overspray") can be discharged or expelled from the painting chamber with a relatively small air flow amount.

PATENT DOCUMENTS

Patent Document 1: Japanese Unexamined Patent Application No. 2017-087159
Patent Document 2: Japanese Unexamined Patent Application No. 2017-087160
Patent Document 3: Japanese Unexamined Patent Application No. 2017-124357
Patent Document 4: Japanese Unexamined Patent Application No. 2018-187542
Patent Document 5: Japanese Unexamined Patent Application No. 2018-192433

SUMMARY OF THE INVENTION

In the case of the painting facility having an air supplying section provided in the substantially entire ceiling face, a relatively high downflow velocity (e.g. at least 0.25 m/s or more) is required in order to maintain a favorable painting environment that can prevent color casting among painting objects while reducing soiling of the painting device or a wall of the painting chamber by uncoated paint mist, so the facility suffers a problem of difficulty in air flow amount reduction.

Further, in the case of the painting facility having an air supplying section at a locally limited part of the ceiling, uncoated paint mist can be discharged with a smaller amount of air flow than the case of the painting facility having an air supplying section over the entire ceiling face. However, the effect of reducing paint adhesion to the painting device or the wall face of the painting chamber and the effect of preventing color casting phenomenon among painting objects are not necessarily sufficient, thus, there remains room for improvement in the respect of maintaining favorable painting environment. Moreover, respecting the arrangement of the air supplying section, its initial cost becomes higher with increase of its complexity. So, it is also desired that the air supplying section has a more simple arrangement.

The object of the present invention is to provide a painting facility that allows a more favorable painting environment to be maintained, yet allowing also energy saving through reduction of air flow amount as well as reduction of the initial cost.

According to a characterizing feature of a painting facility relating to the present invention, the painting facility comprises:

a painting chamber in which a spray painting operation is effected on a painting object;

an air supplying chamber configured to supply air into the painting chamber via an air supplying section provided in a ceiling portion of the painting chamber; and an air discharging chamber configured to suction air and uncoated paint mist present in the painting chamber via a floor discharging section of the painting chamber;

wherein two said air supplying sections are disposed in left-right symmetry relative to a position of the painting object in a width direction of the painting chamber as the center therebetween;

air is released in a radial form from an outlet portion of each one of the two air supplying sections; and in the outlet portion, there are provided at least two kinds of air velocity areas providing different air outlet velocities in accordance with outlet directions of the air.

With the above-described arrangement, as there are provided at least two kinds of air velocity areas providing different air outlet velocities in accordance with outlet directions of the air, it becomes readily possible to form a low-velocity descending flow and a high-velocity descending flow on the upper side and the lateral side of the painting object, respectively. With the low-velocity descending flow formed on the upper side of the painting object, occurrence of scattering and stagnation of uncoated paint mist is suppressed, whereby the coating efficiency is improved and the color casting phenomenon among the painting objects is prevented also. Further, with the high-velocity descending flow formed on the lateral side of the painting object, uncoated paint mist can be caused to flow down and adhesion of paint to the painting device or the lateral wall face of the painting chamber can be reduced.

Therefore, through combination of a plurality of kinds of air velocity areas providing different air outlet velocities from each other, a favorable painting environment can be maintained; and also, the air flow amount can be reduced significantly, as compared with the conventional painting facility with the air supplying section provided over the substantially entire ceiling face. This arrangement not only allows reduction of the fan power, but also leads to reduction of air-conditioning load or air-discharging treatment load, compactization of the facility and reduction of the facility cost. Furthermore, since the arrangement of the air supplying section is simple, there is no increase of the initial cost, either.

In the painting facility relating to the present invention, preferably:

the outlet portion includes a low air velocity area and a high air velocity area, an air outlet velocity of the air released from the low air velocity area being set lower than an air outlet velocity of the air released from the high air velocity area;

in the high air velocity area, the air is released in a horizontal direction on the side of the painting object and a downward perpendicular direction; and in the low air velocity area, the air is released in an obliquely downward direction on the side of the painting object, an obliquely downward direction on the side of the lateral wall of the painting chamber and in a horizontal direction on the side of the lateral wall of the painting chamber.

With the above-described arrangement, as the air released in the horizontal direction on the side of the painting object is provided with a high velocity, these flows of air collide each other at the center portion between the two air supplying sections, thus being formed together into a descending flow, which eliminates uncoated paint mist present upwardly of the painting object and with increase in the air velocity between the painting objects in the advancing direction of these painting objects, color casting phenomenon is effectively prevented.

Further, as the air flow released in the downward perpendicular direction is provided with a high velocity, it becomes easy to eliminate uncoated paint mist which is generated at the time of painting the lateral face of the painting object.

Whereas, as the air flow released in the obliquely downward direction on the side of the painting object is provided with a low velocity, vortex flow will hardly occur at the portion bound between the high air velocity area corresponding to the horizontal direction on the side of the painting object and the high air velocity area corresponding to the downward perpendicular direction, so that a stagnant area where stagnation of uncoated paint mist tends to occur can be eliminated.

Moreover, as the air flow released in the obliquely downward direction on the side of the lateral wall of the painting chamber and the air flow released in the horizontal direction on the side of the lateral wall of the painting chamber are provided respectively with a low velocity, in addition to the prevention of vortex flow generation, it is also possible to prevent the uncoated paint mist from reaching the painting device or the lateral wall of the painting chamber, so that soiling thereof can be lessened.

In the painting facility relating to the present invention, preferably:

the outlet portion includes a low air velocity area and a high air velocity area, an air outlet velocity of the air released from the low air velocity area being set lower than an air outlet velocity of the air released from the high air velocity area; and in the high air velocity area, the air is released in a horizontal direction on the side of the painting object; and in the low air velocity area, the air is released in an obliquely downward direction on the side of the painting object, a downward perpendicular direction, an obliquely downward direction on the side of the lateral wall of the painting chamber and in a horizontal direction on the side of the lateral wall of the painting chamber.

With the above-described arrangement, as the air released in the horizontal direction on the side of the painting object is provided with a high velocity, the these flows of air collide each other at the center portion between the two air supplying sections, thus being formed together into a descending flow, which eliminates uncoated paint mist present upwardly of the painting object and with increase in the air velocity between the painting objects in the advancing direction of these painting objects, color casting phenomenon is effectively prevented.

Further, as the air flow released in an obliquely downward direction on the side of the painting object, the air flow released in a downward perpendicular direction, the air flow released in an obliquely downward direction on the side of the lateral wall of the painting chamber and the air flow released in a horizontal direction on the side of the lateral wall of the painting chamber are provided respectively with a low velocity, in addition to the prevention of vortex flow generation, it is possible to prevent the uncoated paint mist from reaching the painting device or the lateral wall of the painting chamber, so that soiling thereof can be lessened.

In the painting facility relating to the present invention, preferably, the velocity of the air released from the high air velocity area ranges from 0.3 m/s to 0.7 m/s.

With the above-described arrangement, it becomes readily possible to discharge the uncoated paint mist from the painting chamber speedily, while reducing adhesion of paint to the painting device or the lateral wall face of the painting chamber.

In the painting facility relating to the present invention, preferably:

the velocity of the air released from the low air velocity area is from 30% to 70% of the velocity of the air released from the high air velocity area.

With the above-described arrangement, the effect of reducing the air flow amount can be enhanced while preventing generation of vortex of the air flow upwardly of the painting object which will lead to stagnation of the uncoated paint mist.

In the painting facility relating to the present invention, preferably:

each one of the two air supplying section is disposed on more outer side than the right end and the left end of the painting object in the width direction of the painting chamber.

With the above-described arrangement, it becomes easy to block the flow of uncoated paint mist having a horizontal velocity component by the descending flows from the air supplying sections, thus reducing the possibility of soiling of the lateral wall of the painting chamber.

In the painting facility relating to the present invention, preferably:

a vertical cross sectional shape of the air supplying section is an approximately semicircular shape and a curved portion of this approximately semicircular shape forms the outlet portion.

With the above-described arrangement, along the curved portion of the approximately semicircular shape, air can be released in a radial form more uniformly.

In the painting facility relating to the present invention, preferably:

the diameter of the approximately semicircular shape of the air supplying section is set such that an average air velocity in the painting chamber ranges from 0.075 m/s to 0.25 m/s.

With the above-described arrangement, stagnation of the uncoated paint mist hardly occurs in the low velocity descending flows formed upwardly of the painting object and also the velocity of the descending flows formed upwardly of the painting object is prevented from becoming too high, so that the flow amount reducing effect can be maintained.

In the painting facility relating to the present invention, preferably:

a pendant wall portion is provided at the center portion between the two air supplying sections in the ceiling portion of the painting chamber.

With the above-described arrangement, it is possible to decrease irregularity of the air flow velocities on the left and right opposed sides of the painting chamber across the center portion between the two air supplying sections, while reducing velocity energy loss of the air flow released in the horizontal direction on the side of the painting object.

DESCRIPTION OF EMBODIMENTS

Embodiments of a painting facility relating to the present invention will be explained with reference to the accompanying drawings.

Figure 1:
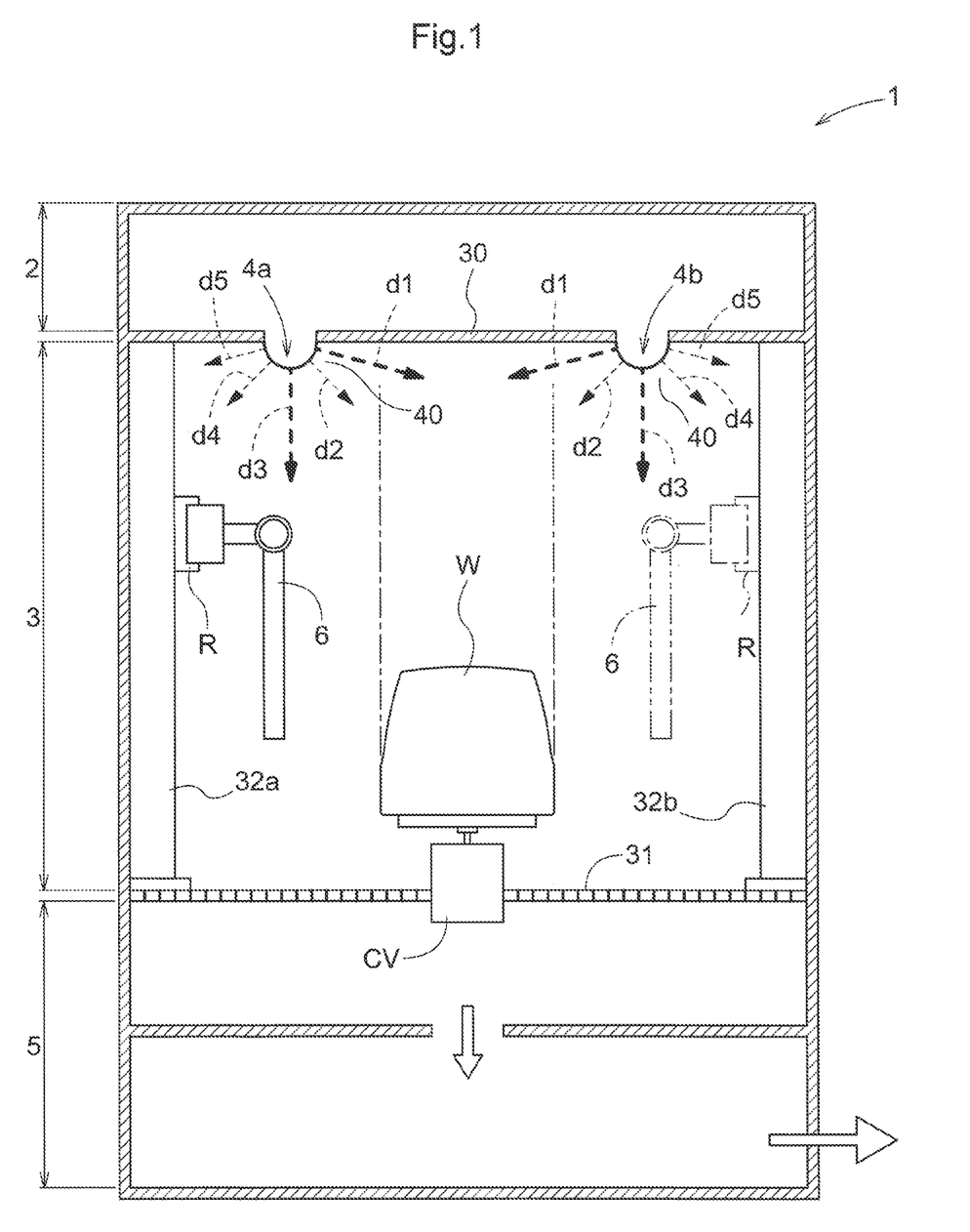
FIG. 1 is a front schematic arrangement diagram of a painting facility.

Incidentally, in this detailed description, a language "width direction" means the horizontal direction in the front face of the painting facility as shown in FIG. 1 for instance. Also, a language "depth direction" means the horizontal direction (conveying direction of painting objects) in the lateral face of the painting facility.

(Painting Facility)

As shown in FIG. 1, a painting facility 1 includes a painting chamber 3 in which a spray painting (coating) operation is effected on a painting object W such as a body of an automobile for instance, an air supplying chamber 2 configured to supply air into the painting chamber 3 via two air supplying sections 4a, 4b provided in a ceiling portion 30 of the painting chamber 3, and an air discharging chamber 5 configured to suction air and uncoated paint mist present in the painting chamber 3 via a grating floor 31 (an example of "floor discharging section") of the painting chamber 3.

The air supplying chamber 2 is disposed immediately above the painting chamber 3 and an unillustrated air supplying fan is connected to this air supplying chamber 2. In operation, air pressure-supplied from the air supplying fan is released into the painting chamber 3 via the two air supplying section 4a, 4b. Incidentally, the air supplying chamber 2 provided in this embodiment employs the ceiling chamber method. However, the invention is not limited thereto, and it may alternatively employ e.g. a duct method for instance.

The painting chamber 3 includes a conveyer mechanism CV for carrying in/out the painting object W to/from the inside of this painting chamber 3 and an articulated robot type automatic spraying device 6 having a spraying gun. The conveyer mechanism CV is installed at the center portion in the width direction of the floor in the entire depth direction.

The automatic spraying device 6 used in this embodiment includes a moving type wall-hung spraying robot. This wall-hung spraying robot is configured to be movable along a rail R placed in the lateral wall and the rail R is provided in the entire depth direction of the painting chamber 3.

In operation, on the painting object W carried in by the conveyer mechanism CV and stopped at a predetermined position, a spray painting (coating) operation with predetermined paint is effected thereon with an automatic operation of the automatic painting device 6 according to a preset time schedule.

The floor of the painting chamber 3 includes a grating floor 31 as a "floor discharging section" and is configured to allow communication of air therethrough.

The air discharging chamber 5 is disposed immediately below the painting chamber 3 and an unillustrated air discharging fan is connected to this air discharging chamber 5. In operation, discharge gas containing the air and the uncoated paint mist from the painting chamber 3 is suctioned through the grating floor 31.

The air discharging chamber 5 includes a paint mist removing device (not shown) for separating and removing the uncoated pant mist from the discharge gas. Incidentally, the paint mist removing device may be any known mist removing device, whether it may be a wet type configured to cause reserved cleaning water to entrap paint mist therein or a dry type configured to cause a cardboard filter or the like to entrap the paint mist.

Discharge gas suctioned into the air discharging chamber 5 in association with driving of the air discharging fan will have its uncoated paint mist content separated and removed by the paint mist removing device and then will be discharged to the outside of the painting facility 1.

(Air Supplying Section)

The two air supplying sections 4a, 4b are disposed in the left-right symmetry relative to, as a center therebetween, the position of the painting object W (corresponding to the position of the conveyer mechanism CV to be described later) in the width direction of the painting chamber 3 and these air supplying sections 4a, 4b are provided in the entire depth direction of the painting chamber 3.

Figure 3:
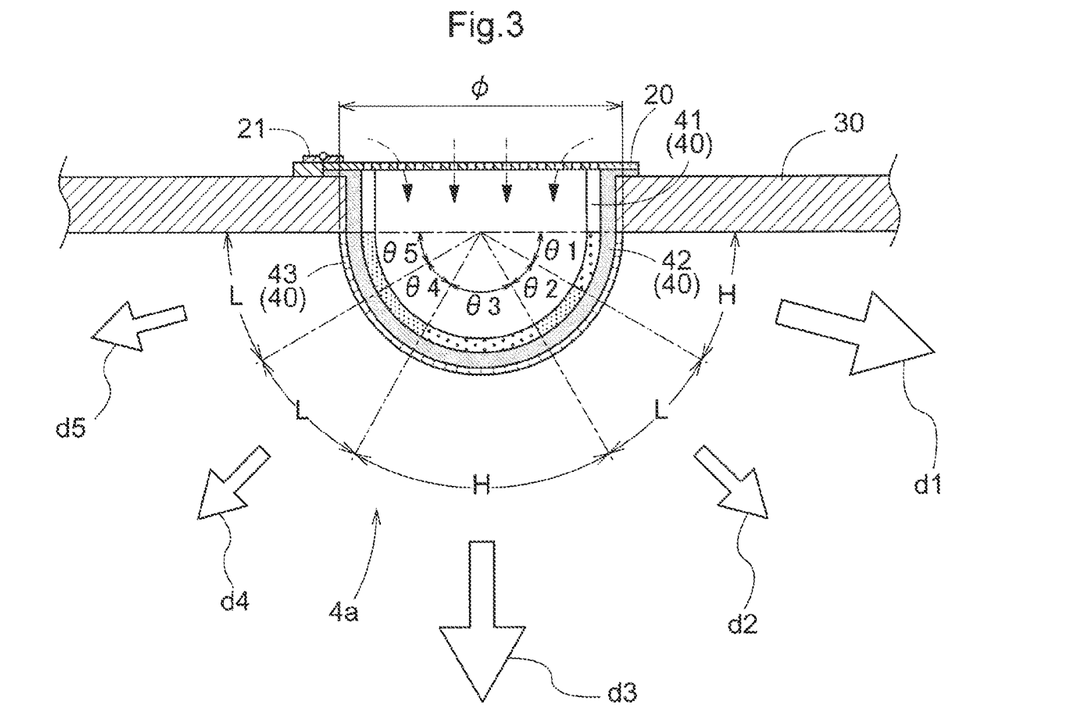
FIG. 3 is a schematic showing in enlargement a vertical cross sectional face of the air supplying section.

The vertical cross sectional shapes of both the two air supplying sections 4a, 4b in this embodiment are approximately semicircular shapes and the semicylindrical portion forming the curved portion of the approximately semicircular shape is disposed on the side of the painting chamber 3 and constitutes an air outlet portion 40.

Incidentally, the diameter φ of the approximately semicircular shape of the air supplying sections 4a, 4b should be set preferably to provide an average air flow velocity in the painting chamber 3 which ranges from 0.075 m/s to 0.25 m/s. For instance, in case the painting facility 1 relating to the present invention is applied to a passenger car as the painting object W, it is desirable that the diameter φ of the semicircular shape of the air supplying sections 4a, 4b ranges from 600 mm to 1000 mm. If the diameter φ is too small, there tends to occur stagnation of uncoated paint mist in the low velocity descending flows formed upwardly of the painting object W. Conversely, if the diameter φ is too large, the velocity of the low velocity descending flows formed upwardly of the painting object W becomes too high, so that paint may be washed away inadvertently or the air amount reducing effect will become weak.

The air outlet portion 40 of the respective two air supplying sections 4a, 4b includes a semicylindrical shaped flow amount adjusting punching member 41, a semicylindrical dustproof filter 42, and a semicylindrical filter frame 43. The air flow amount adjusting punching member 41 is formed integral with a rectifying plate 20. The rectifying plate 20, the flow amount adjusting punching member 41 and the filter frame 43 are configured to be porous and are configured such that air of the air supplying chamber 2 passes through the rectifying plate 20 and then is dust-removed by the dustproof filter 42 and then supplied into the painting chamber 3. Incidentally, the flow amount adjusting punching member 41 is fixed to the ceiling portion 30 via a hinge portion 21 provided on one side in its width direction.

Advantageously, each one of the two air supplying sections 4a, 4b should be disposed on more outer side than the right end and the left end of the painting object W in the width direction of the painting chamber 3. Namely, as shown in FIG. 1, the right side air supplying section 4b should advantageously be disposed in the ceiling portion 30 between the position denoted by the one-dot chain line indicating the right end of the spraying object W and a right lateral wall 32b of the painting chamber 3. And, the left side air supplying section 4a should advantageously be disposed in the ceiling portion 30 between the position denoted by one-dot chain line indicating the left end of the spraying object W and a left lateral wall 32a of the painting chamber 3.

If the two air supplying sections 4a, 4b are too close to each other on the side of the painting object W, it becomes difficult to block the flow of uncoated paint mist having the horizontal velocity component by the descending air flows from the air supplying sections, so the lateral wall of the painting chamber 3 tends to be soiled.

Figure 2:
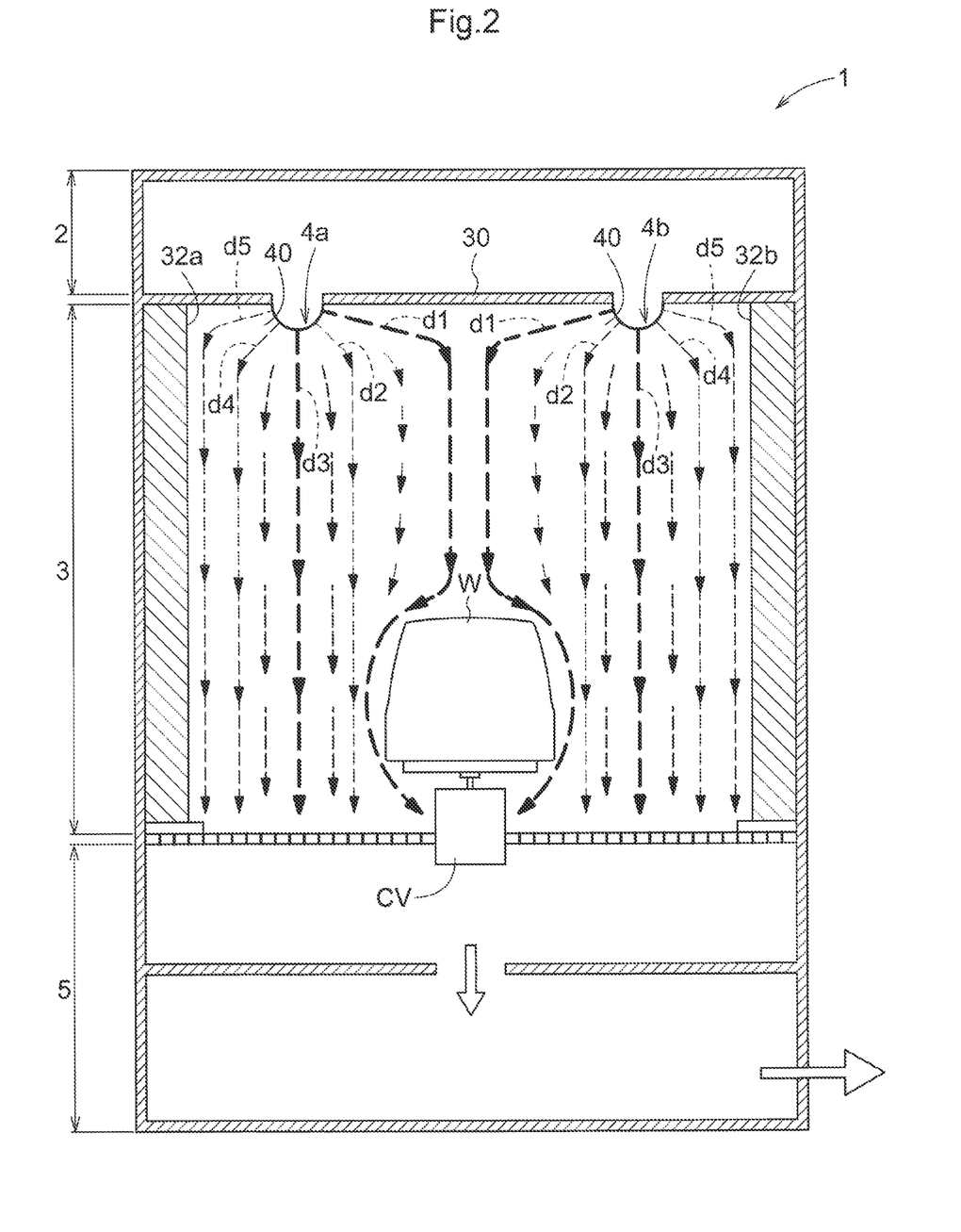
FIG. 2 is a view schematically showing flows of air from air supplying sections.

As shown in FIG. 2 and FIG. 3, it is arranged such that the air is released in a radial form from the respective outlet portions 40 of the two air supplying sections 4a, 4b.

In this embodiment, from the left air supplying section 4a, the air is released in the radial form in such a manner as to include a horizontal direction d1 on the side of the painting object W, an obliquely downward direction d2 on the side of the painting object W, a downward perpendicular direction d3, an obliquely downward direction d4 on the side of the left lateral wall 32a of the painting chamber 3, and a horizontal direction d5 on the side of the left lateral wall 32a of the painting chamber 3. Further, from the right air supplying section 4b, the air is released in the radial form in such a manner as to include the horizontal direction d1 on the side of the painting object W, the obliquely downward direction d2 on the side of the painting object W, the downward perpendicular direction d3, the obliquely downward direction d4 on the side of the right lateral wall 32b of the painting chamber 3, and the horizontal direction d5 on the side of the right lateral wall 32b of the painting chamber 3.

In the outlet portion 40, there are provided at least two kinds of air velocity areas which provide different air outlet velocities according to the releasing directions of the air. Incidentally, the air velocity area in the outlet portion 40 refers not only to the portion constituting this outlet portion 40, but the circumference thereof (the space where the air released from this portion is present).

As shown in FIG. 3, in this embodiment, the outlet portion 40 includes two kinds of air velocity areas referred to as a low air velocity area L and a high air velocity area H, respectively. The air outlet velocity of the air released from the low air velocity area L is set lower than the air outlet velocity of the air released from the high air velocity area H.

In the high air velocity area H, the air is released in the horizontal direction d1 on the side of the painting object W and the downward perpendicular direction d3. In the low air velocity area L, the air is released in the obliquely downward direction d2 on the side of the painting object W, the obliquely downward direction d4 on the side of the lateral wall of the painting chamber 3 and the horizontal direction d5 on the side of the lateral wall of the painting chamber 3.

Specifically, as shown in FIG. 1 and FIG. 2, in the left air supplying section 4a, the air outlet velocities of the air flow released in the horizontal direction d1 on the side of the painting object W and the downward perpendicular direction d3 are set higher than the air outlet velocities of the air flows released, from the left air supplying section 4a, in the obliquely downward direction d2 on the side of the painting object W, the obliquely downward direction d4 on the side of the left lateral wall 32a of the painting chamber 3 and the horizontal direction d5 on the side of the left lateral wall 32a of the painting chamber 3.

Further, in the right air supplying section 4b, the air outlet velocities of the air flow released in the horizontal direction d1 on the side of the painting object W and the downward perpendicular direction d3 are set higher than the air outlet velocities of the air flows released, from the right air supplying section 4b, in the obliquely downward direction d2 on the side of the painting object W, the obliquely downward direction d4 on the side of the right lateral wall 32b of the painting chamber 3 and the horizontal direction d5 on the side of the right lateral wall 32b of the painting chamber 3.

The high air velocity areas H in the outlet portion 40 of the left air supplying section 4a are areas where the air is released in the horizontal direction d1 on the side of the painting object W and the downward perpendicular direction d3; and the low air velocity areas L in the outlet portion 40 of the left air supplying section 4a are areas where the air is released in the obliquely downward direction d2 on the side of the painting object W, the obliquely downward direction d4 on the side of the left lateral wall 32a of the painting chamber 3, and the horizontal direction d5 on the side of the left lateral wall 32a of the painting chamber 3.

Similarly, the high air velocity areas H in the outlet portion 40 of the right air supplying section 4b are areas where the air is released in the horizontal direction d1 on the side of the painting object W and the downward perpendicular direction d3; and the low air velocity areas L in the outlet portion 40 of the right air supplying section 4b are areas where the air is released in the obliquely downward direction d2 on the side of the painting object W, the obliquely downward direction d4 on the side of the right lateral wall 32b of the painting chamber 3, and the horizontal direction d5 on the side of the right lateral wall 32b of the painting chamber 3.

As shown in FIG. 3, the high air velocity areas H and the low air velocity areas L in the outlet portion 40 of the left air supplying section 4a, in correspondence with each of the horizontal direction d1 on the side of the painting object W, the obliquely downward direction d2 on the side of the painting object W, the downward perpendicular direction d3, the obliquely downward direction d4 on the side of the left lateral wall 32a of the painting chamber 3, and the horizontal direction d5 on the side of the left lateral wall 32a of the painting chamber 3, can be divided by predetermined angles from the center of the semicircle of the vertical cross section of this air supplying section, e.g. θ1=30 degrees, θ2=30 degrees, θ3=60 degrees, θ4=30 degrees, θ5=30 degrees.

Though not shown, the high air velocity areas H and the low velocity areas L in the outlet portion 40 of the right air supplying section 4b, similarly to the above-described left air supplying section 4a, in correspondence with each of the horizontal direction d1 on the side of the painting object W, the obliquely downward direction d2 on the side of the painting object W, the downward perpendicular direction d3, the obliquely downward direction d4 on the side of the right lateral wall 32b of the painting chamber 3, and the horizontal direction d5 on the side of the right lateral wall 32b of the painting chamber 3, can be divided by predetermined angles from the center of the semicircle of the vertical cross section of this air supplying section, e.g. 30 degrees, 30 degrees, 60 degrees, 30 degrees, 30 degrees.

The setting of air velocities of the high air velocity areas H and the low air velocity areas L in the outlet portions 40 of the two air supplying sections 4a, 4b respectively can be done by e.g. changing the kind or the thickness of filter material of the dustproof filter 42 or varying the aperture ratio of the flow amount adjusting punching member 41. Specifically, for example, by setting the thickness of the filter material of the dustproof filter 42 provided in the high air velocity area H smaller than the thickness of the filter material of the dustproof filter 42 provided in the low air velocity area L or setting the aperture ratio of the flow amount adjusting punching member 41 forming the high air velocity area H higher than the aperture ratio of the flow amount adjusting punching member 41 forming the low air velocity area L, a velocity difference can be created. Needless to say, the air flow velocity adjusting arrangement is not limited to such arrangements of the dustproof filter 42, the flow amount adjusting punching member 41, etc., but a flow velocity adjusting mechanism different from such arrangements may be provided.

The velocity of the air released from the high air velocity area H ranges from 0.3 m/s to 0.7 m/s, preferably. With this setting, it becomes easier to discharge uncoated paint mist from the painting chamber 3 in a speedy manner, while reducing adhesion of the uncoated paint mist to the painting device or the lateral walls of the painting chamber 3.

Further, preferably, the velocity of the air released from the low air velocity area L should be from 30% to 70% velocity of the velocity of the air released from the high air velocity area H. In case the velocity of the air released from the low air velocity area L is less than 30% of the velocity of the air released from the high air velocity area H, there will be formed a vortex of air flow upwardly of the painting object W, which leads to higher tendency of stagnation of the uncoated paint mist. Conversely, if the velocity of the air released from the low air velocity area L exceeds 70% of the velocity of the air released from the high air velocity area H, there may sometimes occur a situation of the effect of air flow reducing amount becoming weaker.

As described above, with provision in the outlet portion 40 of at least two kinds of air velocity areas providing air outlet velocities different from each other according to the air discharging directions, it becomes easier to form a low velocity descending flow and a high velocity descending flow on the upper side and the lateral sides of the painting object W, respectively. The low velocity descending flow formed upwardly of the painting object W serves to reduce the possibility of scattering and stagnation of the uncoated paint mist, whereby the coating efficiency is improved and color casting phenomenon among the painting objects is prevented also. Further, the high velocity descending flows formed on the lateral sides of the painting object W serve to cause the uncoated paint mist to flow down, thus reducing paint adhesion to the painting device or the lateral walls of the painting chamber 3.

Therefore, through the combination of the plurality of kinds of air flow velocity areas providing air outlet velocities different from each other, it is possible to maintain a favorable painting environment and also, in comparison with the conventional painting facility having an air supplying section provided substantially on the entire ceiling face, the air flow amount can be reduced significantly. This leads also to not only reduction in the fan power, but also to reduction of the air conditioning load and air discharging treatment load, compactization of the facility and cost reduction of the facility. Moreover, as the arrangement of the air supplying section is simple, no increase of initial cost occurs either.

In particular, in the case of the foregoing embodiment in which the high air velocity area H and the low air velocity area L are provided in the outlet portion 40, by providing the air flows released in the horizontal direction d1 on the side of the painting object W with high velocity, these air flows collide against each other at the center portion between the two air supplying sections 4a, 4b to be formed into a descending flow, which serves to eliminate uncoated paint mist present upwardly of the painting object W and the air velocity between the painting objects in the advancing direction of these painting objects W is increased to prevent color casting phenomenon.

Further, by providing the air flows released in the downward perpendicular direction d3 with high velocity, it becomes easy to eliminate uncoated paint mist which is generated at the time of painting the lateral face of the painting object W.

By providing the air flow released in the obliquely downward direction d2 on the side of the painting object W with low velocity, this suppresses generation of vortex at the area bound between the high air velocity area H corresponding to the horizontal direction d1 on the side of the painting object W and the high air velocity area H corresponding to the downward perpendicular direction d3, so it becomes possible to eliminate any stagnation area where the uncoated paint mist tends to stagnate.

Moreover, by providing the air flow released in the obliquely downward direction on the side of the lateral wall of the painting chamber 3 and the air flow released in the horizontal direction on the side of the lateral wall of the painting chamber 3 with low velocity, it becomes possible to prevent reaching of the uncoated paint mist to the painting device or the lateral wall of the painting chamber 3, while preventing generation of vortex, whereby soiling can be reduced. Incidentally, if the air flow released in the obliquely downward direction on the side of the lateral wall of the painting chamber 3 and the air flow released in the horizontal direction on the side of the lateral wall of the painting chamber 3 are provided with high velocity, this may invite generation of vortex, thus providing adverse opposite effect.

Further, in the foregoing embodiment, the descending flow at the center portion (upwardly of the painting object W) in the width direction of the painting chamber 3 provides an air flow velocity distribution having a chevron shape. Namely, by increasing the air flow velocity (dynamic pressure) at the center of the chevron and by decreasing the air flow velocity (dynamic pressure) on the left and right opposed sides of the center of the chevron, it is possible to reduce the static pressure at the center of the chevron and to increase the static pressures on the left and right opposed sides of the center, whereby air flows will be gathered at the center and prevention of scattering and speedy discharge of uncoated paint mist are made possible. As a result, the descending flow at the center portion (upwardly of the painting object W) in the width direction of the painting chamber 3 can effectively prevent color casting phenomenon to the subsequent painting object W.

According to the foregoing embodiment, upwardly of the painting object W, there is formed the low velocity descending air flow at the velocity ranging e.g. from 0.1 m/s to 0.2 m/s, approximately and on the opposed lateral sides of the painting object W, there are formed the high velocity air flows ranging approximately from 0.20 m/s to 0.25 m/s, for example, and in the area adjacent this high velocity descending flow, there is formed the low velocity descending flow with suppressed stagnation and reverse flow. By the air supplying method combining these low velocity descending flows and the high velocity descending flow, it becomes possible to reduce the air flow amount of the painting facility as a whole by 40% to 50%, in comparison with the conventional painting facility (forming uniform descending flow of 0.3 m/s) having an air supplying section provided over the substantially entire ceiling face.

[Maintenance Method of Air Supplying Sections]

Figure 6:
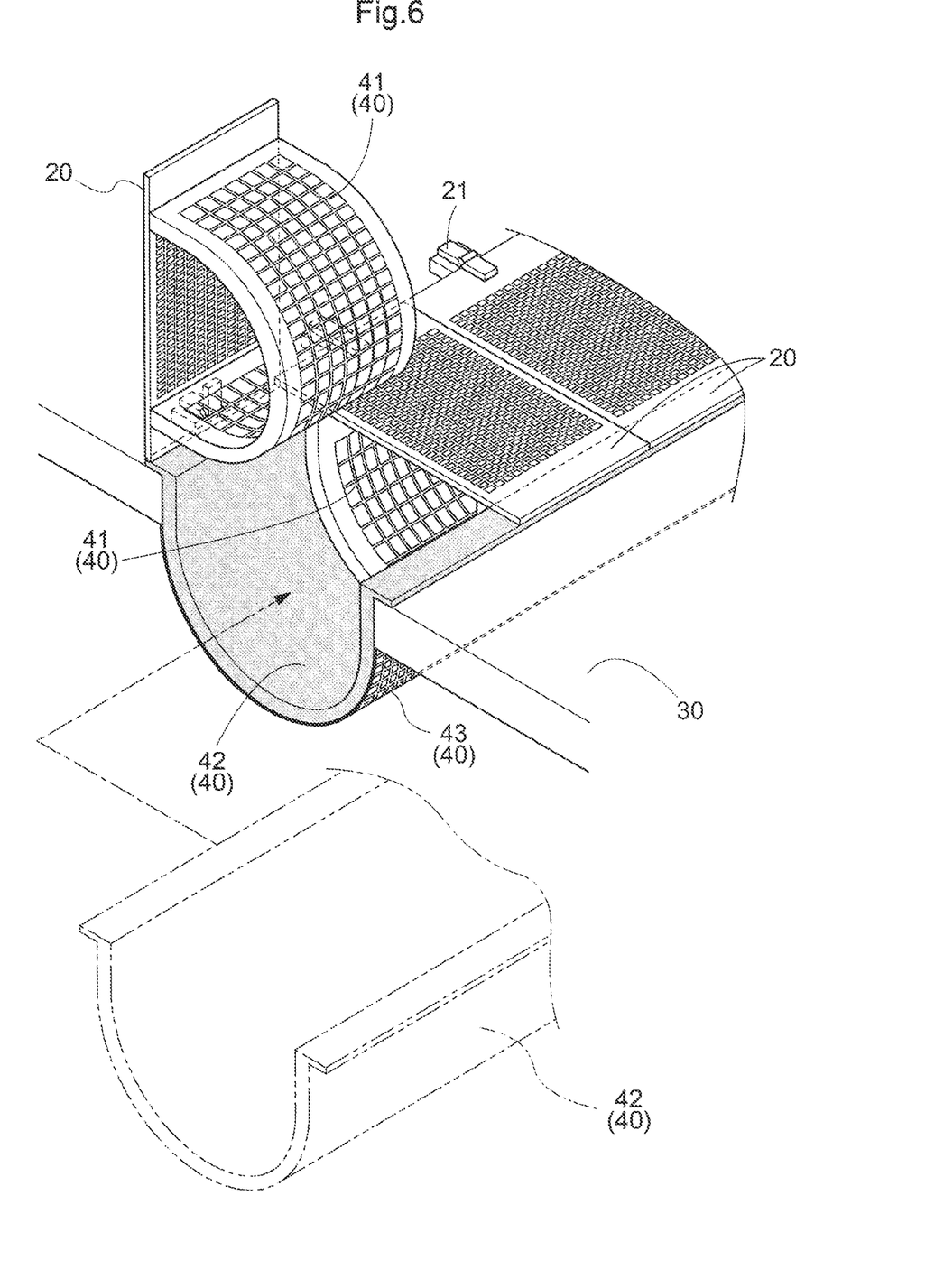
FIG. 6 is a perspective view showing a maintenance method of the air supplying section.

In case the dustproof filter 42 of the air supplying section in this embodiment is to be replaced, as shown in FIG. 6, the used dustproof filter 42 can be removed by upwardly rotating the air flow adjusting punching member 41 having the rectifying plate 20 about the hinge portion 21 as the pivotal center. Then, a new dustproof filter 42 will be attached to the filter frame 43 and the air flow amount adjusting punching member 41 will be rotated downwards to press down the dustproof filter 42 from the above, thus attaching this dustproof filter 42. Incidentally, as shown in FIG. 6, regarding the air flow amount adjusting punching plate 41, this may be divided into a plurality of portions in the depth direction.

OTHER EMBODIMENTS

Figure 4:
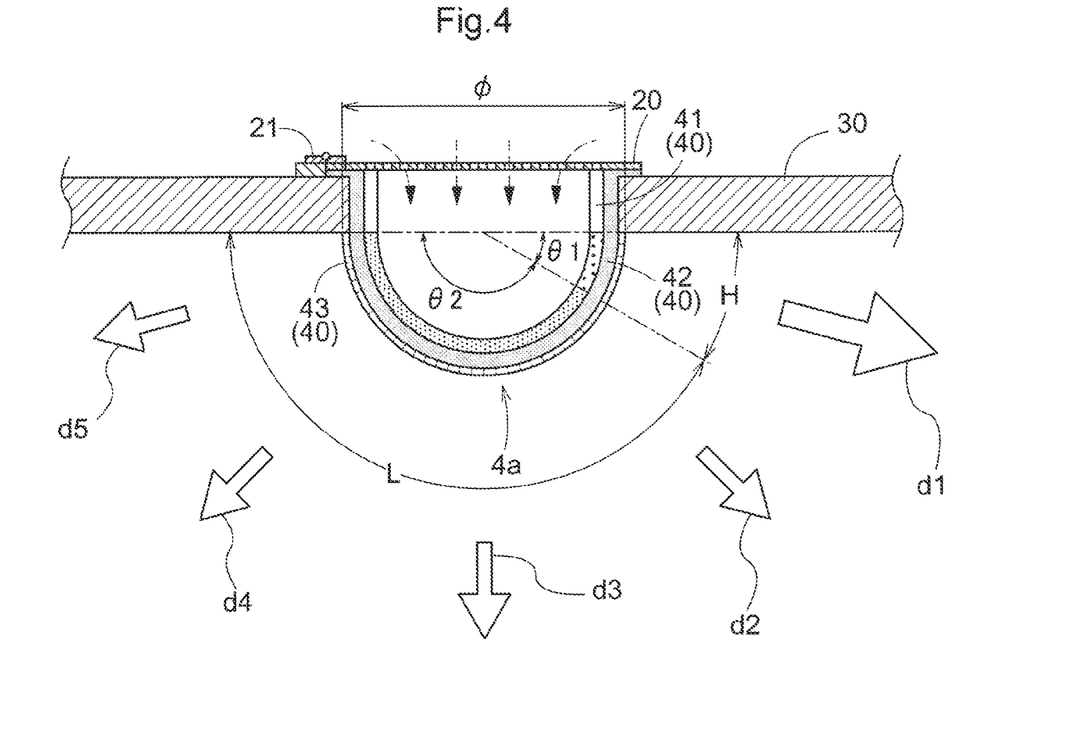
FIG. 4 is a schematic showing in enlargement a vertical cross sectional face of an air supplying section relating to a further embodiment.

1. In the foregoing embodiment, it may be alternatively arranged such that in the high air velocity area H, the air flow is released in the horizontal direction d1 on the side of the painting object W and in the low air velocity area L, the air flow is released in the obliquely downward direction d2 on the side of the painting object W, the downward perpendicular direction d3, the obliquely downward direction d4 on the side of the lateral wall of the painting chamber 3 and the horizontal direction d5 on the side of the lateral wall of the painting chamber 3. Namely, as shown in FIG. 4, even if the high air velocity area H is limited only to the horizontal direction d1 (θ1) on the side of the painting object W and all the other directions (θ2) are set as the low air velocity areas L, in this case too, substantially same advantageous effect as that of the foregoing embodiment can be achieved; and also, in particular, if the air flow amount is set same as that of the case of the foregoing embodiment, uncoated paint mist discharging effect at the center portion between the two air supplying sections 4a, 4b in the ceiling portion 30 of the painting chamber 3 (in this embodiment, the width-wise center portion of the ceiling portion 30 of the painting chamber 3) will be improved, so that the color casting phenomenon among the painting objects W can be prevented even more reliably.

Figure 5:
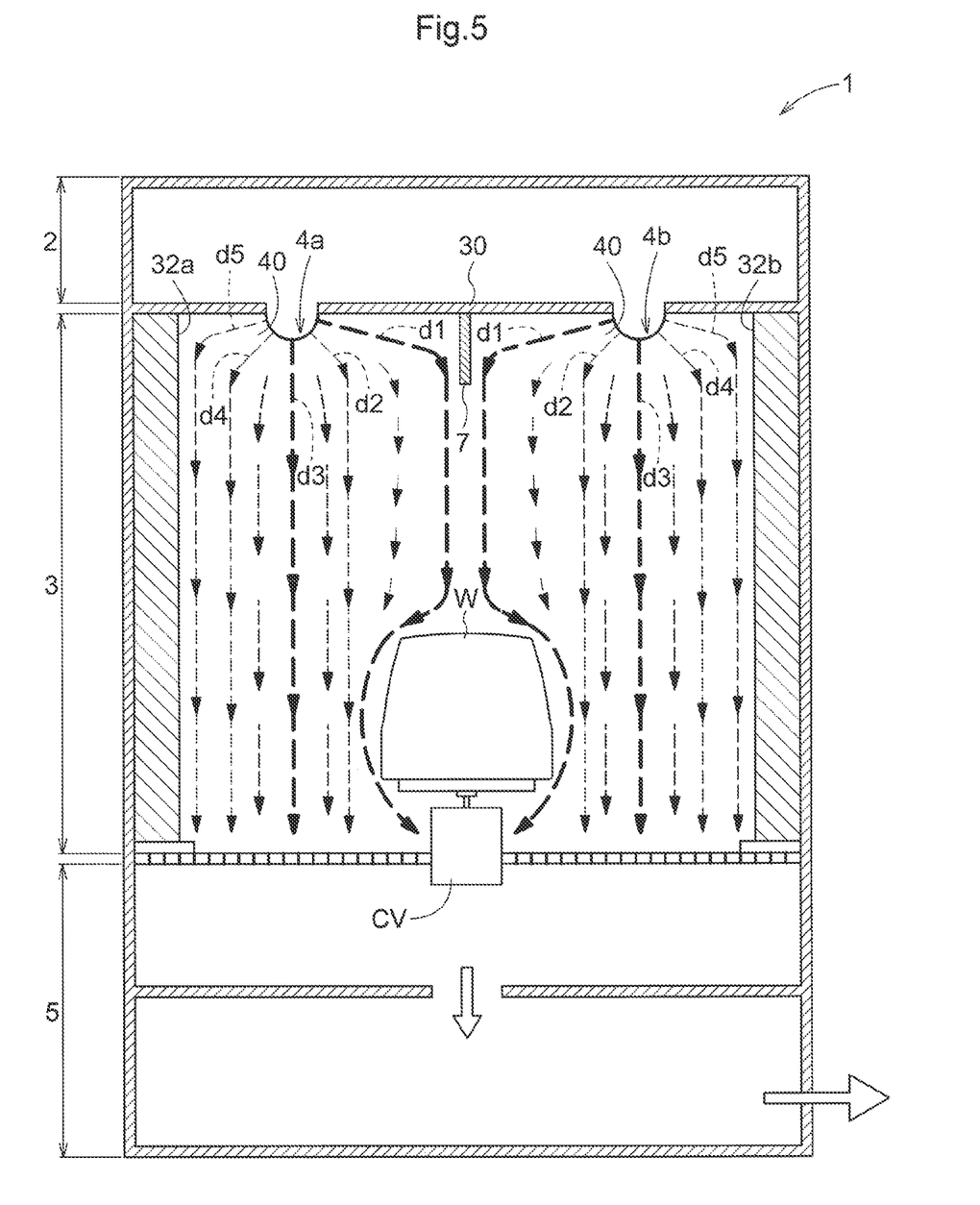
FIG. 5 is a view schematically showing air flows from air supplying sections in case the painting chamber includes a pendant wall portion.

2. As shown in FIG. 5, a pendant wall portion 7 may be provided at the center portion between the two air supplying sections 4a, 4b in the ceiling portion 30 of the painting chamber 3 (in this embodiment, the width-wise center portion of the ceiling portion 30 of the painting chamber 3). Such pendant wall portion 7 is provided in correspondence with the air supplying sections 4a, 4b, and such pendant wall portion 7 may be provided in the entire depth direction of the painting chamber 3, for example. When no such pendant wall portion 7 is provided, in particular, the air flows released in the horizontal direction d1 on the side of the painting object W from each one of the two air supplying sections 4a, 4b will collide against each other at the center portion between these two air supplying sections 4a, 4b, thus tending to lose their velocity energies. On the other hand, with provision of the pendant wall portion 7, it is possible to reduce irregularity of air flow velocities on the left and right opposed sides in the painting chamber 3 across the center portion between the two air supplying sections 4a, 4b, while effectively reducing the velocity energy loss of the air released in the horizontal direction d1 on the side of the painting object W.

3. The air supplying section in the foregoing embodiment employs the arrangement of its vertical cross sectional shape being semicircular. However, the invention is not limited thereto. Alternatively, for instance, the vertical cross sectional shape may be a semi-oval shape or a polygonal shape near an arcuate shape (the number of faces constituting the outlet portion is equal to or greater than five).

4. The high air velocity areas sectioned in the foregoing embodiment need not necessarily be set to a same air flow velocity. Similarly, the low air velocity areas sectioned in the foregoing embodiment too need not necessarily be set to a same air flow velocity. These velocities may be varied, if necessary.

5. In the foregoing embodiment, there was employed the arrangement in which the outlet portion includes the two kinds of air flow velocity areas of the high air velocity area and the low air velocity area providing a lower air outlet velocity than the high velocity area. However, the invention is not limited thereto. As a further air velocity area, there may be provided, for instance, an intermediate air velocity area that provides an air flow velocity which is lower than that of the high air velocity area, but higher than that of the low air velocity area.

6. In the foregoing embodiment, there was disclosed the arrangement in which the air supplying sections are provided over the entire depth direction of the painting chamber. However, the invention is not limited thereto. The air supplying section may be provided not over the entire depth direction of the painting chamber, but provided limitedly to the area in which a painting operation is effected.

Incidentally, the present invention has been explained with reference to the accompanying drawings as above. However, it is understood as a matter of course that the present invention is not limited to the arrangements shown in these drawings, but may be embodied in various modes within a range not deviating from the essence of the present invention.

INDUSTRIAL APPLICABILITY

The painting facility of this invention may be particularly suitably used in a variety of technical fields for effecting a painting or coating operation on e.g. a body of an automobile, a railway car, a civil engineering machine, etc. in its entirety or on a constituent part(s) thereof.

DESCRIPTION OF SIGNS

1: painting facility
2: air supplying chamber
20: rectifying plate
21: hinge portion
3: painting chamber
30: ceiling portion
31: grating floor (an example of "floor discharging portion")
32a: left lateral wall
32b: right lateral wall
4a, 4b: air supplying section
40: outlet portion
41: air flow amount adjusting punching member
42: dustproof filter
43: filter frame
5: air discharging chamber
6: automatic painting device
7: pendant wall portion
H: high air velocity area
L: low air velocity area
d1: horizontal direction on side of painting object
d2: obliquely downward direction on side of painting object
d3: downward perpendicular direction
d4: obliquely downward direction on side of lateral wall of painting chamber
d5: horizontal direction on side of lateral wall of painting chamber
W: painting object
CV: conveyer mechanism
R: rail
φ: diameter

The invention claimed is:

1. A painting apparatus comprising:
a painting chamber in which a painting object is conveyed in a conveying direction, the painting chamber comprising:
a first air supplying section disposed on a ceiling portion of the painting chamber and to left of the painting object in a width direction crossing the conveying direction;
a second air supplying section disposed on the ceiling portion and to right of the painting object in the width direction;
a floor discharging section disposed on a floor surface of the painting chamber;
a left side face that is disposed on a side of the first air supplying section which side is opposite to the painting object in the width direction and that extends in the conveying direction; and
a right side face that is disposed on a side of the second air supplying section which side is opposite to the painting object in the width direction and that extends in the conveying direction;
an air supplying chamber configured to supply air into the painting chamber via the first air supplying section and the second air supplying section; and
an air discharging chamber configured to suction air and uncoated paint mist present in the painting chamber via the floor discharging section,
wherein the painting chamber is a painting chamber in which a painting operation is effected on the painting object,
wherein the first air supplying section releases air in a direction toward the right side face and in a vertically downward direction at a first velocity, and releases air in an obliquely downward direction between the direction toward the right side face and the vertically downward direction at a second velocity lower than the first velocity, and
wherein the second air supplying section releases air in a direction toward the left side face and in a vertically downward direction at the first velocity, and releases air in an obliquely downward direction between the direction toward the left side face and the vertically downward direction at the second velocity.

2. The painting apparatus of claim 1, wherein the first velocity ranges from 0.3 m/s to 0.7 m/s.

3. The painting apparatus of claim 2, wherein the second velocity is from 30% to 70% of the first velocity.

4. The painting apparatus of claim 1, wherein a vertical cross sectional shape of the first air supplying section and the second air supplying section is a semicircular shape, and a curved portion of this semicircular shape forms the outlet portion.

5. The painting apparatus of claim 4, wherein a diameter of the semicircular shape of the first air supplying section and the second air supplying section is set such that an average air velocity in the painting chamber ranges from 0.075 m/s to 0.25 m/s.

6. The painting apparatus of claim 1, wherein a pendant wall portion is provided at a center portion between the first air supplying section and the second air supplying section in the ceiling portion.

7. The painting apparatus of claim 1,
wherein the first air supplying section releases air in the direction toward the left side face and in an obliquely downward direction between the direction toward the left side face and the vertically downward direction at the second velocity, and
wherein the second air supplying section releases air in the direction toward the right side face and in an obliquely downward direction between the direction toward the right side face and the vertically downward direction at the second velocity.

8. A painting apparatus comprising:
a painting chamber in which a painting object is conveyed in a conveying direction, the painting chamber comprising:
a first air supplying section disposed on a ceiling portion of the painting chamber and to left of the painting object in a width direction crossing the conveying direction;
a second air supplying section disposed on the ceiling portion and to right of the painting object in the width direction;
a floor discharging section disposed on a floor surface of the painting chamber;
a left side face that is disposed on a side of the first air supplying section which side is opposite to the painting object in the width direction and that extends in the conveying direction; and
a right side face that is disposed on a side of the second air supplying section which side is opposite to the painting object in the width direction and that extends in the conveying direction, the painting chamber being a painting chamber in which a painting operation is effected on the painting object;

an air supplying chamber configured to supply air into the painting chamber via the first air supplying section and the second air supplying section; and an air discharging chamber configured to suction air and uncoated paint mist present in the painting chamber via the floor discharging section, wherein the first air supplying section releases air in a direction toward the right side face at a first velocity, and releases air in a vertically downward direction and in an obliquely downward direction between the direction toward the right side face and the vertically downward direction at a second velocity lower than the first velocity, and wherein the second air supplying section releases air in a direction toward the left side face at the first velocity, and releases air in a vertically downward direction and in an obliquely downward direction between the direction toward the left side face and the vertically downward direction at the second velocity.

9. The painting apparatus of claim 8, wherein the first velocity ranges from 0.3 m/s to 0.7 m/s.

10. The painting apparatus of claim 9, wherein the second velocity is from 30% to 70% of the first velocity.

11. The painting apparatus claim 8, wherein a vertical cross sectional shape of the first air supplying section and the second air supplying section is a semicircular shape and a curved portion of this semicircular shape forms the outlet portion.

12. The painting apparatus of claim 8, wherein a pendant wall portion is provided at the center portion between the first air supplying section and the second air supplying section in the ceiling portion.

13. The painting apparatus of claim 8, wherein the first air supplying section releases air in the direction toward the left side face and in an obliquely downward direction between the direction toward the left side face and the vertically downward direction at the second velocity, and wherein the second air supplying section releases air in the direction toward the right side face and in an obliquely downward direction between the direction toward the right side face and the vertically downward direction at the second velocity.

* * * * *